United States Patent [19]

Glomb, Jr.

[11] Patent Number: 4,595,856

[45] Date of Patent: Jun. 17, 1986

[54] PIEZOELECTRIC FLUIDIC POWER SUPPLY

[75] Inventor: Walter L. Glomb, Jr., Ellington, Conn.

[73] Assignee: United Technologies Corporation, Hartford, Conn.

[21] Appl. No.: 766,236

[22] Filed: Aug. 16, 1985

[51] Int. Cl.[4] .......................................... H01L 41/08
[52] U.S. Cl. ..................................... 310/339; 310/323
[58] Field of Search ............... 310/311, 338, 339, 328, 310/323; 322/2; 290/1 R; 60/325, 532, 537, 538, 419, 904

[56] References Cited

U.S. PATENT DOCUMENTS

| | | | |
|---|---|---|---|
| 1,493,340 | 5/1924 | Hahnemann et al. | |
| 2,509,913 | 5/1950 | Espenschied | 290/4 |
| 2,522,389 | 9/1950 | Mason | 171/327 |
| 2,531,230 | 11/1950 | Mason | 290/1 |
| 2,539,535 | 1/1951 | Espenschied | 290/1 |
| 3,166,684 | 1/1965 | Williams et al. | 310/8.7 |
| 3,217,163 | 11/1965 | Cogan | 250/90 |
| 3,217,164 | 11/1965 | Williams et al. | 250/102 |
| 3,239,678 | 3/1966 | Kolm et al. | 310/339 X |
| 3,350,583 | 10/1967 | Schiavone | 310/339 X |
| 3,354,327 | 11/1967 | Benson | 310/8.7 |
| 3,405,334 | 10/1968 | Jewett et al. | 317/250 |
| 3,430,080 | 2/1969 | Horan | 310/339 |
| 3,539,840 | 11/1970 | Campagnuolo | 310/2 |
| 3,600,612 | 8/1971 | Beeken | 310/8.2 |
| 3,621,453 | 11/1971 | Ringwall et al. | 331/64 |
| 3,665,226 | 5/1972 | Sinker et al. | 310/8.3 |
| 3,693,604 | 9/1972 | Horan | 123/119 C |
| 3,865,539 | 2/1975 | Burge, Jr. et al. | 310/339 X |
| 4,005,319 | 1/1977 | Nilsson et al. | 310/8.3 |
| 4,127,804 | 11/1978 | Breaux | 322/2 A |
| 4,288,735 | 9/1981 | Crites | 322/2 A |
| 4,387,318 | 6/1983 | Kolm et al. | 310/330 |
| 4,442,372 | 4/1984 | Roberts | 310/339 |
| 4,511,818 | 4/1985 | Benjamin et al. | 310/339 X |

FOREIGN PATENT DOCUMENTS 253436 9/1969 U.S.S.R. .

*Primary Examiner*—Mark O. Budd
*Attorney, Agent, or Firm*—John Swiatocha

[57] ABSTRACT

A piezoelectric fluidic power supply comprises two piezoelectric devices (30, 31) connected both electrically and fluidically. Each device has a movable piston end (26, 27) which extends into a corresponding fluid chamber (23, 24), each piston variably restricting fluid flow through its corresponding fluid chamber. The first piezoelectric device, responding to fluid pressure changes, acts as a power generating device (30). The second piezoelectric device, responding to the electric power flow of the power generating device acts as a cycle control device (31) by modulating the fluid pressure on the first device. This arrangement effects a cycling of the two pistons, consequently generating electric power. Such an arrangement provides integral fluidic feedback control with inherent impedance matching between the fluid and the piezoelectric components.

4 Claims, 3 Drawing Figures

PIEZOELECTRIC FLUIDIC POWER SUPPLY

TECHNICAL FIELD

This invention relates to power supplies and more particularly to piezoelectric fluidic power supplies which include means for integral fluidic feedback control of electric power oscillations.

BACKGROUND ART

The use of piezoelectric material for generating electric current flow is well known in the art. Piezoelectric crystals, when compressed, generate an electrostatic output. Conversely, application of electric current across a piezoelectric crystal causes contraction of that crystal. Therefore, theoretically, an electric power supply using piezoelectric material should exhibit an enhanced simplicity of construction, requiring only a limited number of nonrotating, moving parts.

A possible use for such a piezoelectric power supply is in aircraft flight control systems. A new generation of aircraft presently under consideration will employ inherently unstable control surfaces and therefore will require a large number of sensors and control surface actuators that must be constantly monitored and controlled by a central computer to maintain stable flight. These sensors and actuators will most likely communicate with the computer through optical fibers to reduce the requirement for electrical wiring. Since optical fibers cannot provide motive electric power to these devices, there is a need for localized power sources. Ideally, such power sources should utilize available high pressure hydraulic actuator fluid, without requiring large fluid flows.

Piezoelectric material is used in prior art power supplies which require either hydraulic fluid valving or internal combustion explosions to compress the crystals. Such devices cannot be used to generate continuous power without some external means of controlling the hydraulic or combustive power oscillations. Phase generators, frequency controllers and other types of external feedback control means make these power supplies complex and unwieldy.

Other prior art piezoelectric power supplies may use fluidic oscillators that cause vibration in a mechanical reed or diaphragm with a piezoelectric element attached thereto. In these devices, the oscillations are caused by acoustic feedback within the fluidic circuit itself, such feedback being generally effected by turbulent fluid flow through restrictions or against sharp objects. The piezoelectric element acts as a passive transducer, converting these vibrations into electrical energy. These power supplies require a high fluid flow velocity to maintain usable power output levels and therefore, are unsuitable for applications where high velocity flow is unavailable or undesirable. Furthermore, such fluidic oscillator power supplies may also suffer from an impedance mismatch between the motive fluid and the piezoelectric element. Acoustic vibrations set up within the fluidic oscillator may not occur at the same frequency as the natural oscillatory frequency of the piezoelectric element. Such a mismatch in oscillatory frequency leads to inefficient conversion of fluid energy to electrical energy. More vibratory energy may be generated in the fluid than can be absorbed by the piezoelectric element. Consequently, such excess vibratory energy is wasted. In fact, at certain frequencies, such an impedance mismatch may cause dampening of the piezoelectric element vibrations with a resultant loss in output power.

DISCLOSURE OF INVENTION

The invention disclosed provides a matched impedance power supply for deriving electric power from a high pressure fluid, such as high pressure hydraulic oil for aircraft actuators, with minimal flow and does so using an integral fluidic feedback control loop to generate and time piezoelectric power oscillations. Two matched piezoelectric devices extend into a motive fluid and are connected electrically in parallel. Fluid pressure on the first device results in an electric power output therefrom. The second piezoelectric device acts as a cycle control device, responding to a current output from the first device by contracting. Contraction of the second piezoelectric device withdraws a restriction from the fluid flow through the oscillator, reducing the fluid pressure against the first piezoelectric device. The first piezoelectric device is decompressed due to the reduced pressure, which then causes the current to drop. The second device, with less current flow therethrough, expands to restrict the fluid flow, thereby increasing the fluid pressure against the first piezoelectric device which repeats the cycle.

The piezoelectric devices may comprise stacks of piezoelectric wafers which operate pistons within corresponding chambers, the chambers accommodating fluid flow therebetween through a connecting passage. The wafer stacks and connecting passage are sized such that the acoustic delay between chambers (the period of the pressure oscillations) is one-half the resonant period of the wafer stacks and that the mechanical Q of the stacks is greater than one, wherein:

$$Q = (Ar/A),$$

and

Ar is the amplitude of the stack vibrations at resonance, and

A is the amplitude of the stack vibrations at the low frequency limit.

Such an arrangement causes the power oscillations to grow in amplitude from start-up of the power supply until the strain in the piezoelectric material reaches its saturation value, whereupon optimum power output is attained.

BEST MODE FOR CARRYING OUT THE INVENTION

Figure 1:
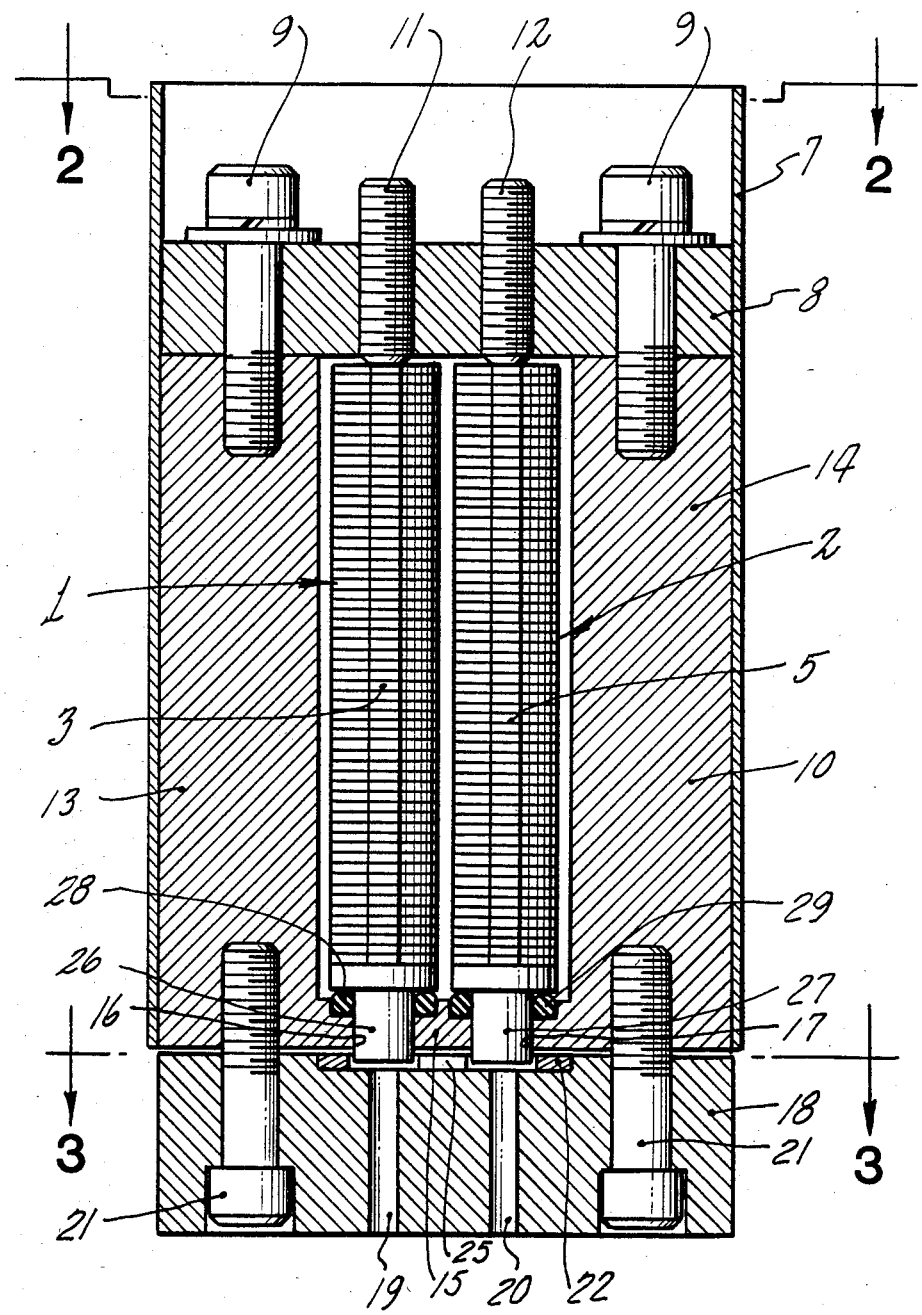
FIG. 1 is a partially sectioned elevation of the piezoelectric fluidic power supply of the present invention.
Figure 2:
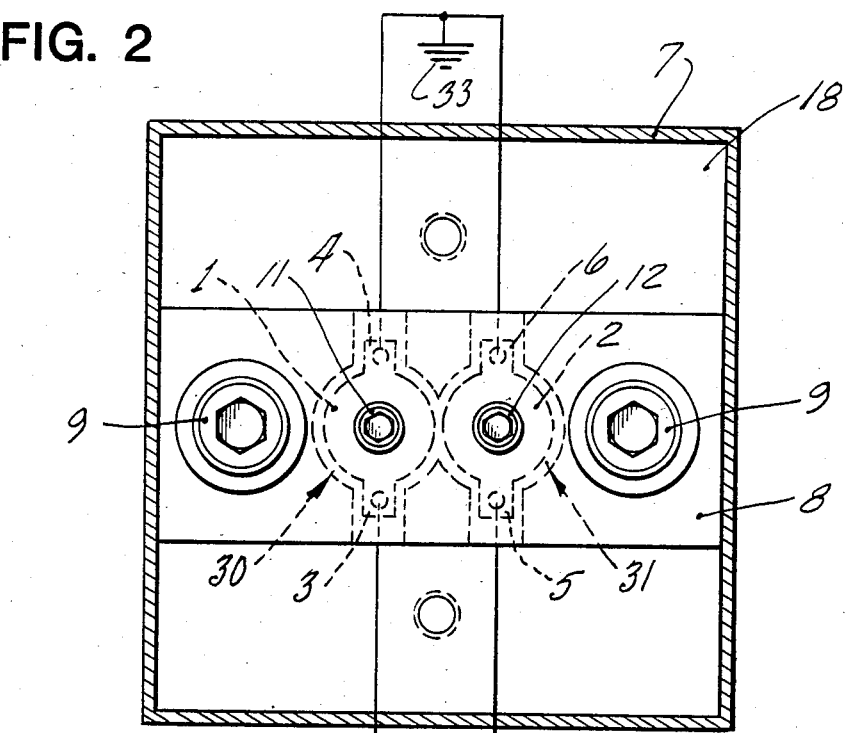
FIG. 2 is a sectional view taken in the direction of line 2—2 of FIG. 1, electrical connections in the power supply being represented schematically.
Figure 3:
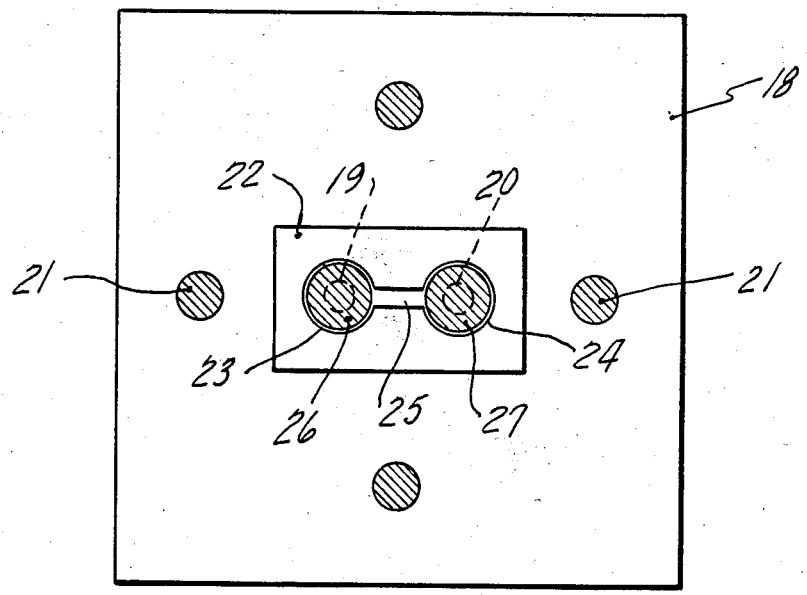
FIG. 3 is a sectional view taken in the direction of line 3—3 of FIG. 1.

Referring to the drawings, piezoelectric ceramic wafer disks are assembled in stacks 1 and 2, the disks in each stack being connected together electrically, in parallel, by termination bus bars—stack 1 by positive bar 3 and negative bar 4, and stack 2 by positive bar 5 and negative bar 6. The wafer stacks are disposed side by side in a housing 7. Housing 7 includes an upper wall 8 fixed by bolts 9 to receptacle 10. Setscrews 11 and 12 received through treaded holes in upper wall 8, compressively restrain stacks 1 and 2, respectively within the housing 7. Receptacle 10 includes side walls 13 and 14 and an integral bottom wall 15 apertured at 16 and 17. A base plate 18 including longitudinal fluid passages 19 and 20 is fixed by bolts 21 to bottom wall 15. A flow plate 22 is clamped between the bottom wall and the base plate, in alignment with passages 19 and 20 in base plate 18. The flow plate contains two chambers 23 and 24 and an interconnecting passage 25 formed therein by machining, chemical etching or the like.

Wafer stacks 1 and 2 are supported in a longitudinal direction by pistons 26 and 27 received within chambers 23 and 24 respectively and sealed from fluid within the chambers by O-ring seals 28 and 29, respectively.

As will be more apparent from the description of the operation of the power supply, stack 1, piston 26 and chamber 23 comprise an electric power generating device 30, while stack 2, piston 27 and chamber 24 comprise a cycle control device 31.

The positive termination bus bar 3 of the power generating device 30 is electrically connected to an external load 32 and to the positive termination bus bar 5 of the cycle control device 31. By way of example, the external load may comprise a suitable amplifying and rectifying circuit. The negative termination bus bar 6 of the cycle control device 31 is connected through a ground connection 33 to bus bar 4.

Operation of the power supply is as follows. At rest, both pistons 26 and 27 extend into the corresponding fluid chambers 23 and 24. As fluid enters fluid chamber 23 under the power generating device 30 through passage 19, piston 26 is driven upwardly, compressing wafer stack 1 and generating current flow from bus bar 3 through load 32 to wafer stack 2. Current flows through wafer stack 2 causing retraction of the piston 27, thereby allowing fluid to flow through connecting passage 25, chamber 24 and discharge passage 20. This relieves pressure in fluid chamber 23 under piston 26. Piston 26 then expands into the fluid chamber 23, decompressing wafer stack 1 and stopping current flow from bus bar 3. Absent current flow from wafer stack 1 to wafer stack 2, wafer stack 2 expands, pushing piston 27 into fluid chamber 24 thereby restricting flow through fluid chamber 24. Such a restriction causes pressure to build in fluid chamber 23, thereby initiating another cycle. Operation is periodically oscillatory and self-sustaining as long as fluid flow and pressure are maintained.

In the preferred embodiment, the piezoelectric components are sized in accordance with the magnitude of operating fluid pressure and the electrical output demands on the device. The fluid flow passages are sized such that the acoustic delay between chambers (the period of the pressure oscillations) will be one-half the resonant period of the wafer stacks and the mechanical Q of the stacks will be greater than one, wherein:

$$Q = (A_r/A),$$

and $A_r$ is the amplitude of the stack vibrations at resonance, and $A$ is the amplitude of the stack vibrations at the low frequency limit.

It will be appreciated that the power supply of the present invention is especially suitable wherever high pressure fluid is available, such as proximally to aircraft hydraulic control surface actuators. Since acoustic pulses in the operating fluid rather than high mass flow mechanically power the device, high flow velocities are not needed. The integral fluidic feedback control exhibited by the power supply facilitates impedance matching between the electrical and fluidic components within the supply, thereby enhancing the efficiency with which fluid mechanical energy is converted to electrical energy. With the limited number of moving parts, routine maintenance is minimized and reliability is improved. Also, due to its simplicity in design, this invention is well suited to miniaturization with consequent enhanced economy of construction.

Although the invention is shown and described with respect to a detailed embodiment, it should be understood by those skilled in the art that various changes such as the use of various numbers of piezoelectric wafers in each device, more piezoelectric devices, or changes in wafer or flow conduit shape, may be made without departing from the present invention. It is intended by the following claims to cover these and any other modifications which fall within the true spirit and scope of this invention.

Having thus described the invention, what is claimed is:

1. A piezoelectric, fluidic power supply for extracting electric power from a pressurized fluid, said power supply being characterized by:
   a piezoelectric power generating device generating electric power by reciprocation of a movable end thereof in response to fluidic oscillations applied thereto;
   a piezoelectric cycle control device generating perodic fluidic oscillations by reciprocation of a movable end thereof in response to period oscillations in electric power applied to said control device;
   means for electrically connecting said piezoelectric devices in a circuit for providing said electric power from said power generating device to said control device;
   means for fluidically connecting said movable ends for the fluidic conduction of said fluidic oscillations from said control device to said power generating device;
   whereby said fluidically and electrically connected devices define a closed loop oscillator wherein periodic oscillations in fluid pressure generate and are induced by periodic oscillations in electric power flow.

2. The power supply of claim 1 further characterized by said piezoelectric devices comprising stacks of piezoelectric ceramic wafers.

3. The power supply of claim 1 further characterized by said movable ends comprising pistons.

4. The power supply of claim 1 further characterized by said means for fluidically connecting said movable ends comprising a pair of chambers communicating with a passage, fluid flow conditions within said chambers and passage inducing an acoustic delay during said fluidic oscillations therein,
   said acoustic delay being one-half the period of a natural oscillation of said devices.

* * * * *